United States Patent [19]

Kang

[11] Patent Number: 5,058,150
[45] Date of Patent: Oct. 15, 1991

[54] AUTOMATIC ANSWERING METHOD FOR A VEHICLE RADIO-TELEPHONE AND DEVICE THEREFOR

[75] Inventor: Seo-Won Kang, Suwon, Rep. of Korea

[73] Assignee: SamSung Electronics Co., Ltd., Suwon, Rep. of Korea

[21] Appl. No.: 356,699

[22] Filed: May 25, 1989

[30] Foreign Application Priority Data

Feb. 28, 1989 [KR] Rep. of Korea ............... 1989-2473

[51] Int. Cl.[5] .................. H04M 1/64; H04M 11/00
[52] U.S. Cl. ........................... 379/58; 379/63; 379/88; 379/98
[58] Field of Search ............ 379/59, 63, 58, 88, 379/98

[56] References Cited

U.S. PATENT DOCUMENTS

| | | | |
|---|---|---|---|
| 4,468,813 | 8/1984 | Burke et al. | 455/38 |
| 4,616,110 | 10/1986 | Hashimoto | 379/88 |
| 4,677,657 | 6/1987 | Nagata et al. | 379/63 |
| 4,731,811 | 3/1988 | Dubus | 379/58 |
| 4,803,717 | 2/1989 | Marui | 379/67 |
| 4,821,311 | 4/1989 | Hashimoto | 379/88 |

Primary Examiner—Thomas W. Brown
Attorney, Agent, or Firm—Robert E. Bushnell

[57] ABSTRACT

An automatic answering device for a vehicle radio-telephone has a voice synthesizing circuit for synthesizing and delivering three different selectable digitally stored answering messages to callers, and a voice analyzing and synthesizing circuit for electronically processing and recording incoming messages from callers. Three modes of answering can be selected by the user and are performed under microprocessor control, for announcing only and informing callers of a number to call, for requesting callers to input DTMF key signals for representing the caller's telephone number, and for recording a caller's voice message. For each of the three modes, a different appropriate answering message is synthesized and output to the caller. The radio-telephone includes an antenna, a radio transmitter, a radio receiver, a duplexer allowing common use of the antenna for receiving and transmitting, audio receiving and transmitting circuits, a wideband data modem for decoding and digitizing received DTMF signals, and adder circuits for adding respective voice synthesis outputs of the voice analyzer and synthesizer circuit and the voice synthesizer circuit with the received and transmitted audio signals.

11 Claims, 12 Drawing Sheets

AUTOMATIC ANSWERING METHOD FOR A VEHICLE RADIO-TELEPHONE AND DEVICE THEREFOR

TECHNICAL BACKGROUND

The present invention concerns an automatic answering device for a vehicle radio-telephone (hereinafter referred to as "car-phone"). This device answers incoming calls automatically with prerecorded announcements. These recordings can tell the caller to leave a message, advise the caller where the person being called is or when he or she is expected back. They allow a car-phone to be useful 24 hours a day.

The conventional automatic answering device for a car-phone has a circuit as shown in FIG. 1. This conventional circuit comprises a controller 5 for controlling all of the car-phone, a memory 1 for storing program and voice message data to be processed by the controller 5, a display 8 for displaying the results obtained by the controller processing the program and the voice message data, a voice synthesizing circuit 2 for synthesizing the voice message data outputted from the memory 1, a low pass filter 3 for eliminating the high frequency noise produced when synthesizing the voice signal by the voice synthesizing circuit 2 to reproduce the original voice message, a radio transmitting modulator 4 for modulating and transmitting the output of the low pass filter 3, a radio receiving demodulator 7 for demodulating the signal received from a radio-telephone, and a wide band data (WBD) modem 6 for decoding and converting into digital data the dual tone multi-frequency signals with this digital data being recognized by the controller 5.

In this conventional car-phone, when the WBD data is received by the radio receiving demodulator 7, it is demodulated and transferred to the WBD modem 6. The WBD modem 6 decodes and digitalize the received signal which is then transferred to the controller 5. The controller 5 makes the car-phone ring.

The controller 5 processes the data outputted from WBD modem 6 according to the program loaded by the memory 1. The results obtained by the processing are stored into the memory 1, and may be displayed on the display 8 if needed. If the called car-phone user does not answer within a predetermined time, the controller 5 controls the memory 1 to read out the message. If the message signal indicating the absence of the called car-phone user is inputted into the voice signal synthesizing circuit 2, it is synthesized thereby into a voice which is transferred to the low pass filter 3. The voice signal divested of the sampled high frequency noise by the low pass filter 3 is transferred to the radio transmitting modulator 4. The radio transmitting modulator 4 modulates the voice signal so as to transmit it to the caller's car-phone. The voice message transmitted will be as follows:

"Hello, This is the number *-. I'm sorry, but he or she is not in. If you would like to speak to him or her, please contact the number *-****"

then, the caller enters his telephone number and the key *. Thus, the caller's telephone number is stored into the car-phone called. Namely, the caller's telephone number is stored into the memory 1. Thus, the conventional automatic answering device can only transmit the receiver's voice message and store the caller's telephone number, but it cannot store the caller's voice message. Of course, this conventional automatic answering device can store the caller's voice message by using a mechanical recording means. However, the mechanical recording means is adversely affected by mechanical vibrations.

SUMMARY OF THE INVENTION

It is an object of the present invention to provide an automatic answering device for a car-phone.

It is another object of the present invention to provide an automatic answering device and a method therefor whereby the caller's message and telephone number are stored and the storage can be monitored if needed.

It is still another object of the present invention to provide an automatic answering device which uses a semiconductor integrated circuit as the means for storing the caller's voice message so as not to be affected by the mechanical vibrations.

According to the present invention, an automatic answering device for a car-phone comprises:

an antenna;

a receiving audio circuit;

a transmitting circuit;

a duplexer 201 for permitting common use of the antenna for both transmitting and receiving;

a radio transmitter 207 for transmitting voice signals as radio frequency signals, the radio transmitter 207 being connected with the duplexer 201;

a radio receiver 202 for receiving voice signals transmitted as radio frequency signal, the radio receiver 202 being connected with the duplexer 201;

a voice analyzing/synthesizing circuit 221 for analyzing and synthesizing by an adaptive delta modulation (ADM) procedure the voice signals received voice analyzing/synthesizing circuit 202 being connected with the radio receiver 202;

a wide band data modem (WBD modem) 222 for decoding and converting into digital data dual tone multi-frequency signals received by the radio receiver 202, the wide band data modem being connected with the radio receiver 202;

a first adder 203 for adding the voice signal outputted from the voice analyzing and synthesizing circuit 221 and the voice signal received by the radio receiver 202 to produce an output to the receiving audio circuit 204;

a voice synthesizing circuit 223 containing an answering voice message for reproducing it as a voice signal by a LPC (linear predictive coding) speech synthesizing procedure;

a controller 206 for controlling the voice analyzing and synthesizing circuit 221 and the voice synthesizing circuit 223 to synthesize a given answering message according to an established mode by receiving the signal digitalized by the decoding of the WBD modem; and a second adder 208 for adding the output answering message of the voice synthesizing circuit 223 and the output voice signal of the transmitting audio circuit 209 to produce an output to the radio transmitter 207.

BRIEF DESCRIPTION OF THE ATTACHED DRAWINGS

For a better understanding of the invention and to show how the same may be carried into effect, reference will now be made, by way of example, to the accompanying diagrammatic drawings, in which.

Figure 3:
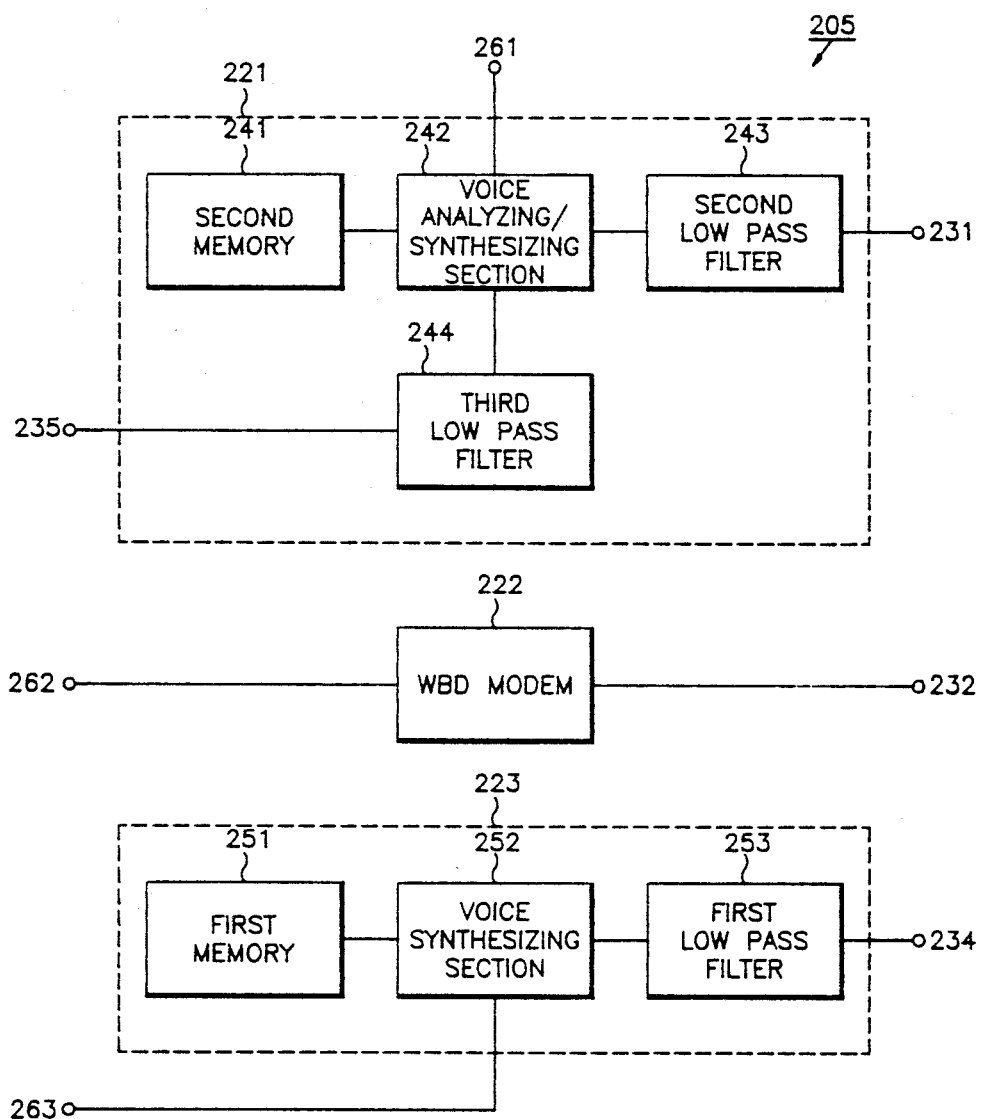
FIG. 3 is a specific embodiment of the automatic answering section 205 in FIG. 2.
Figure 5:
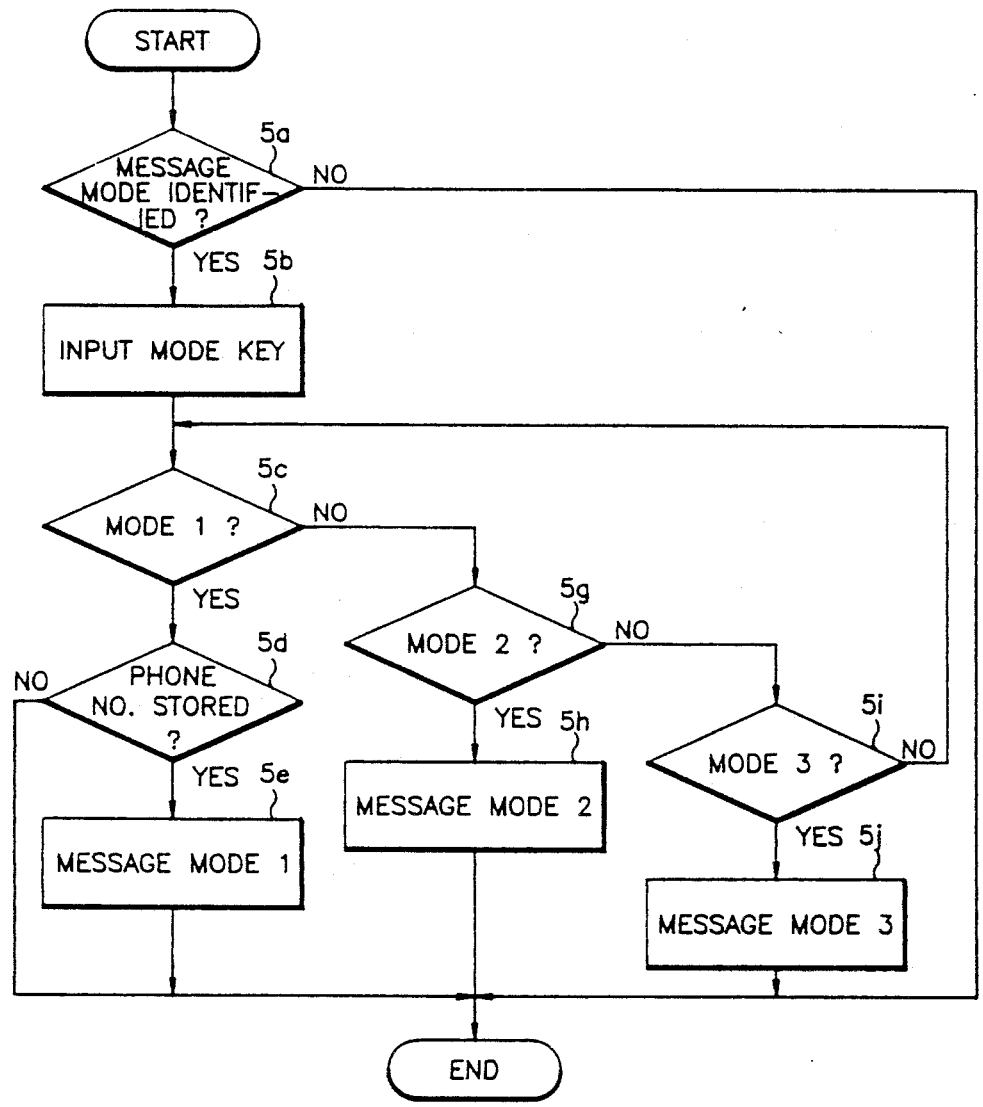
Figure 6:
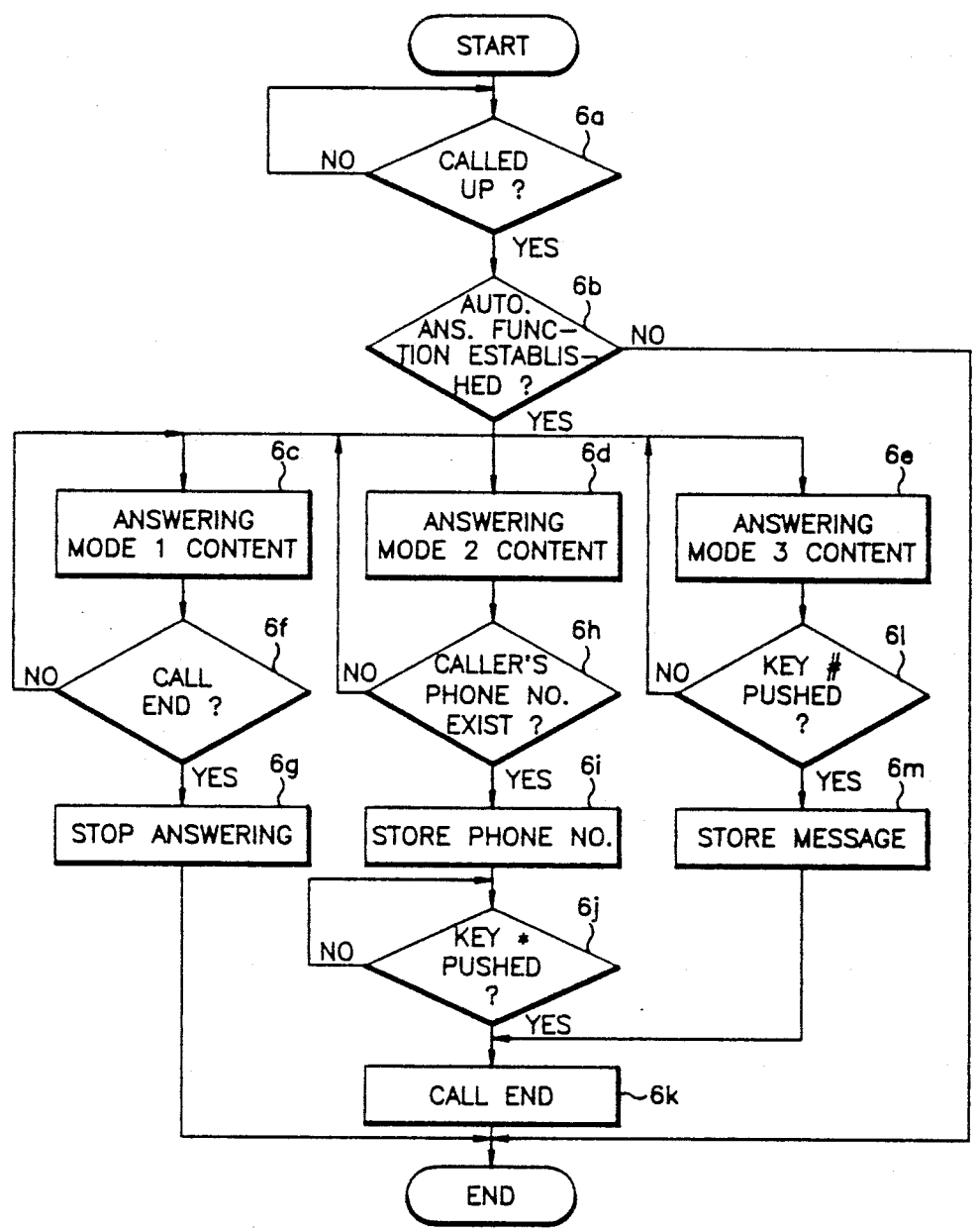
Figure 7:
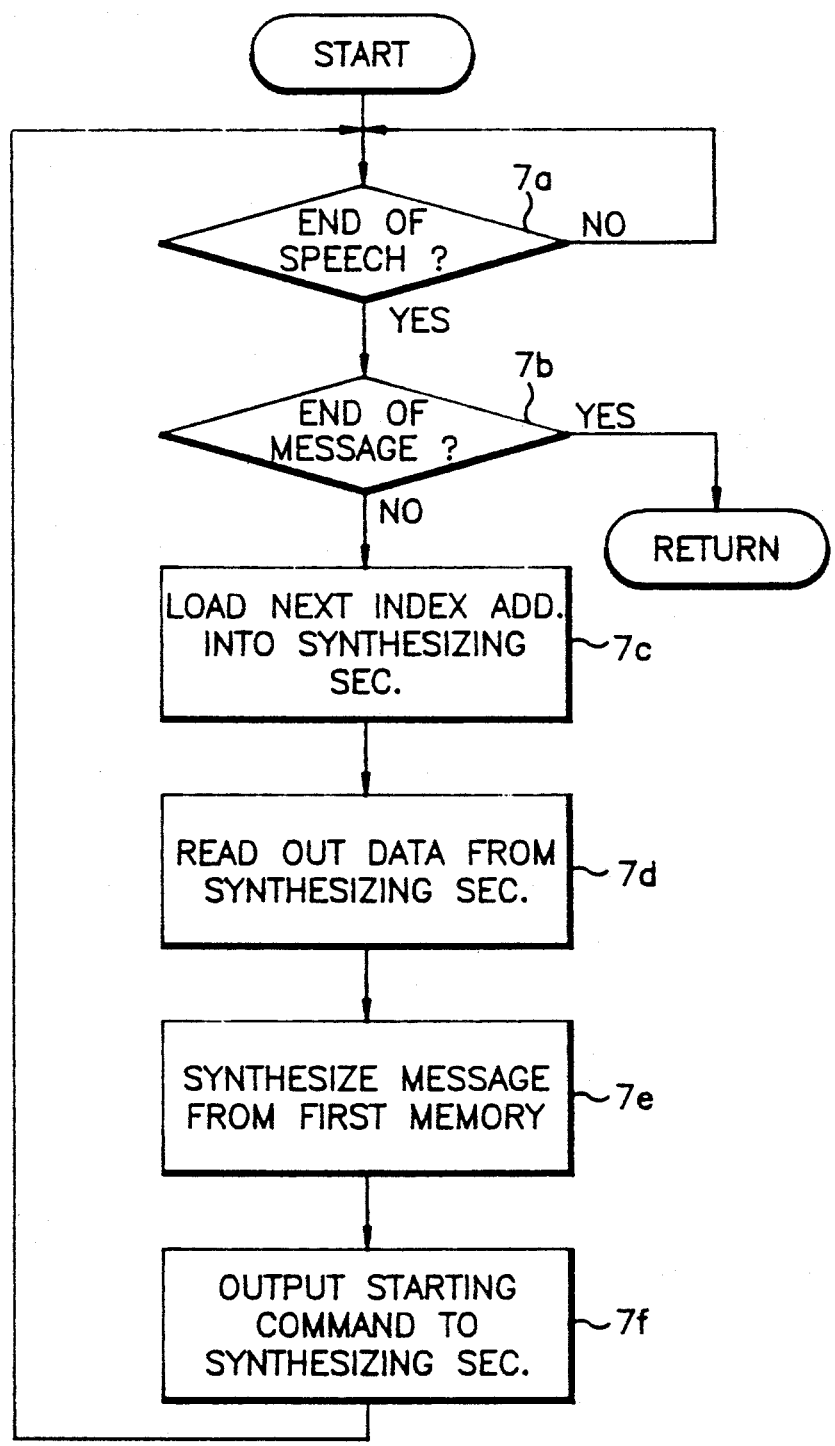
Figure 8:
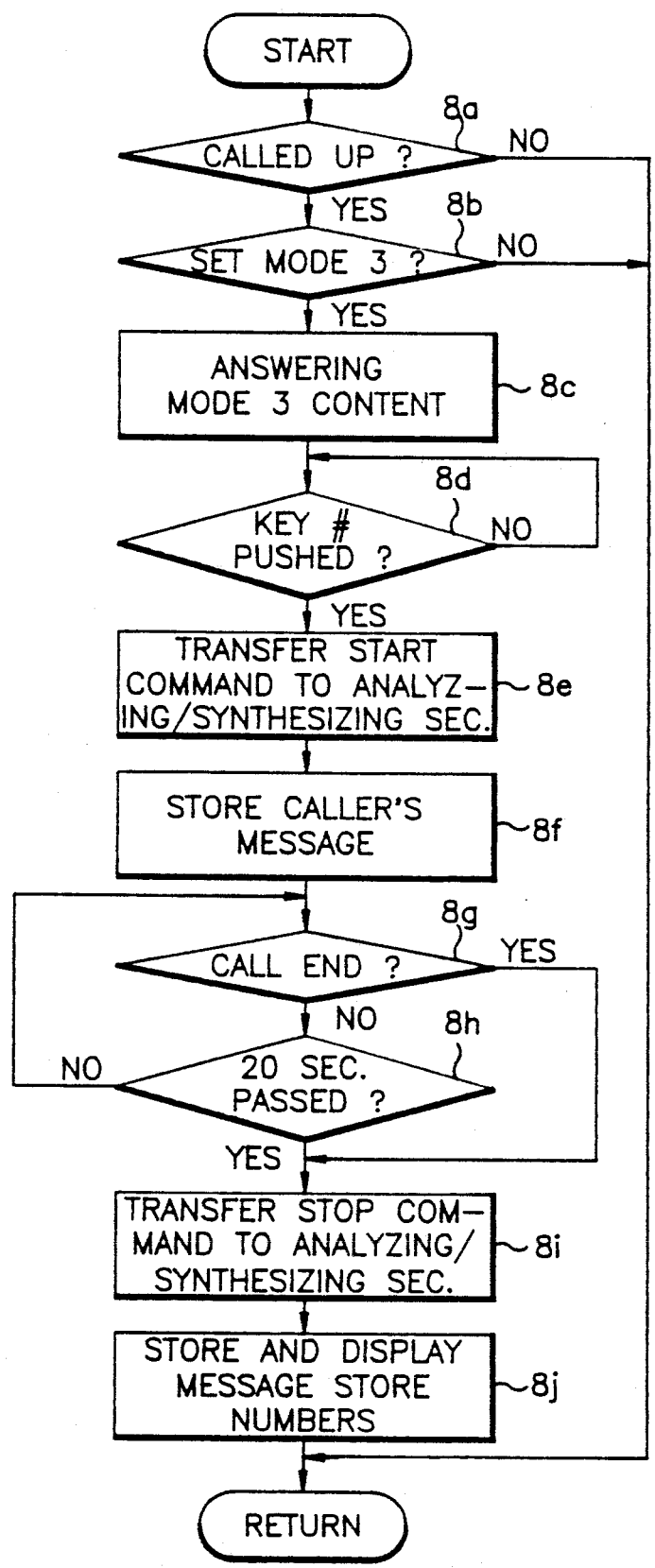
Figure 9:
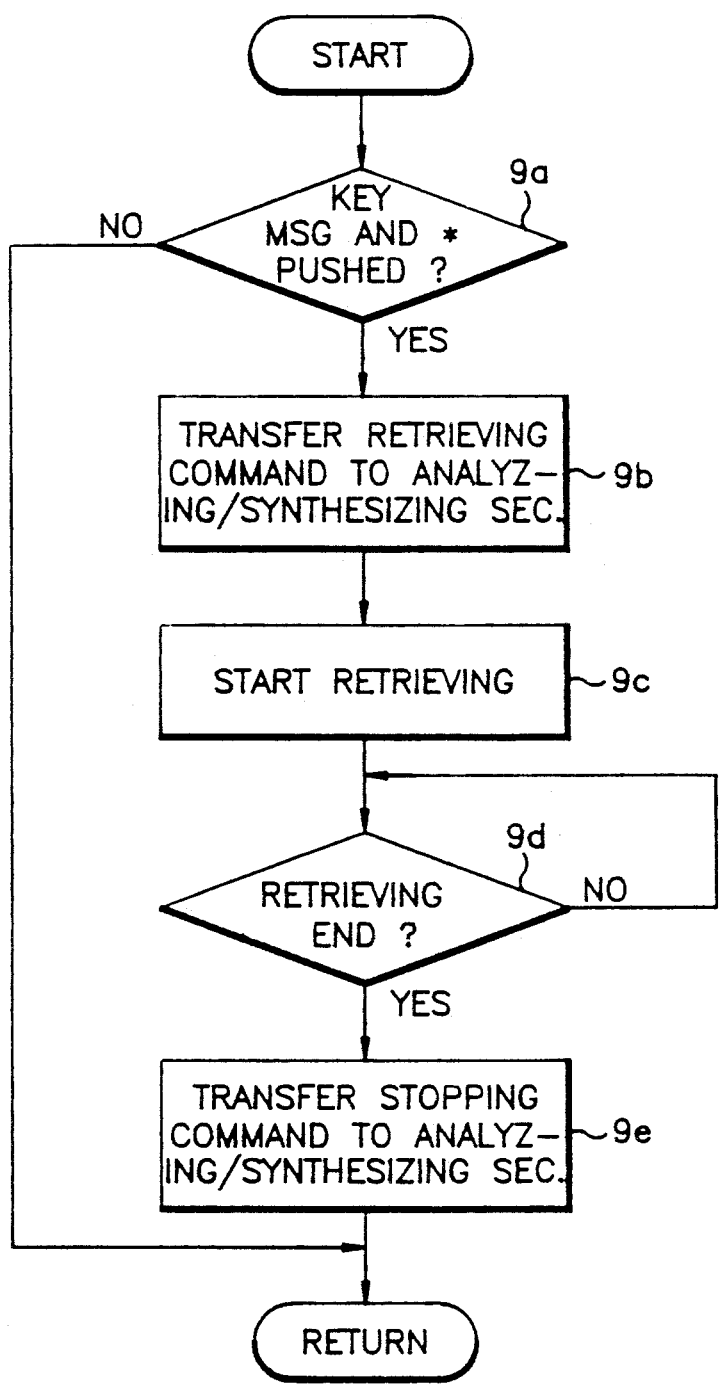

FIG. 4 (A)-(D) illustrate the specific circuit diagram of FIG. 3;

FIG. 5 is the flow chart of establishing message modes according to the present invention;

FIG. 6 is the flow chart of the message being outputted according to the present invention;

FIG. 7 is the flow chart of the message modes 1-3 in FIG. 6 being executed according to the present invention;

FIG. 8 is the flow chart of the message recording of FIG. 6 according to the present invention; and FIG. 9 is the flow chart of the message reproducing according to the present invention.

DETAILED DESCRIPTION OF THE PREFERRED EMBODIMENT

The present invention will now be described specifically with reference to the drawings attached by way of example only.

Figure 1:
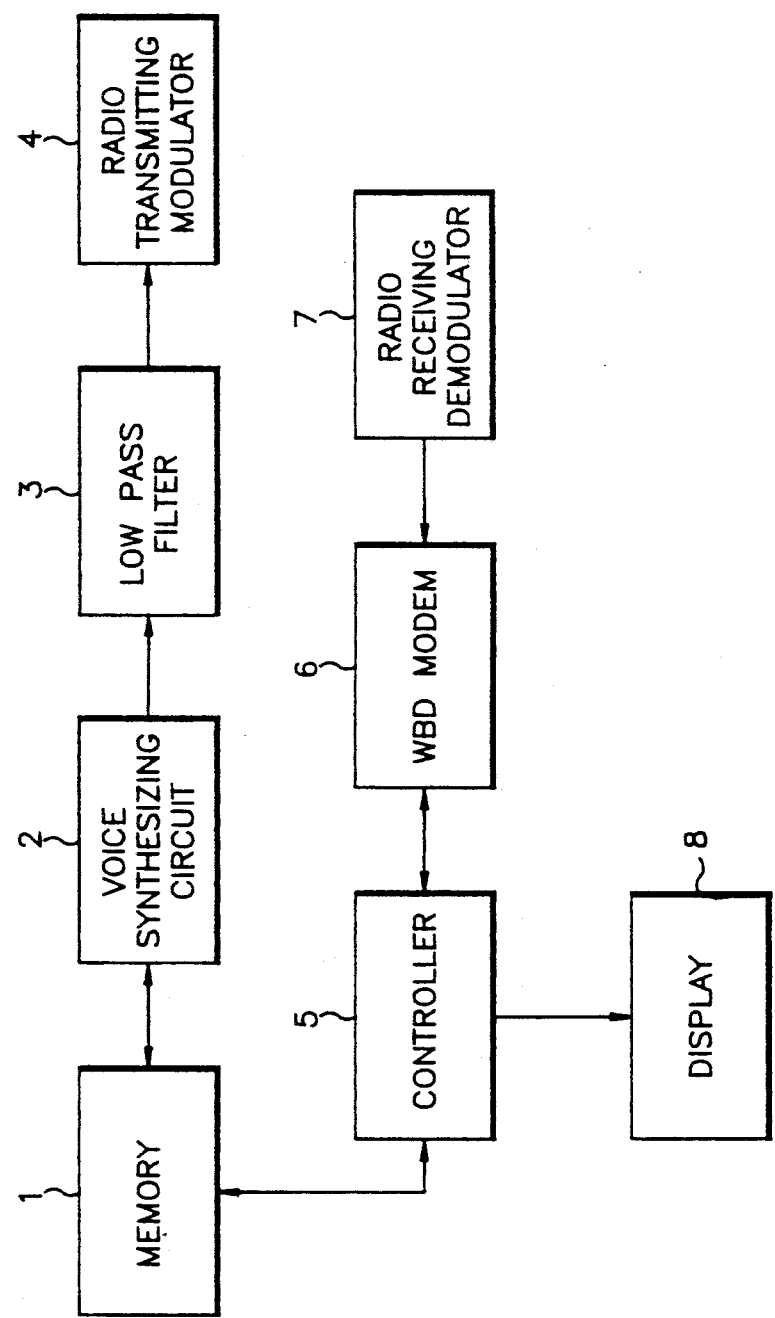
FIG. 1 illustrates a conventional circuit of an automatic answering device for a car-phone.
Figure 2:
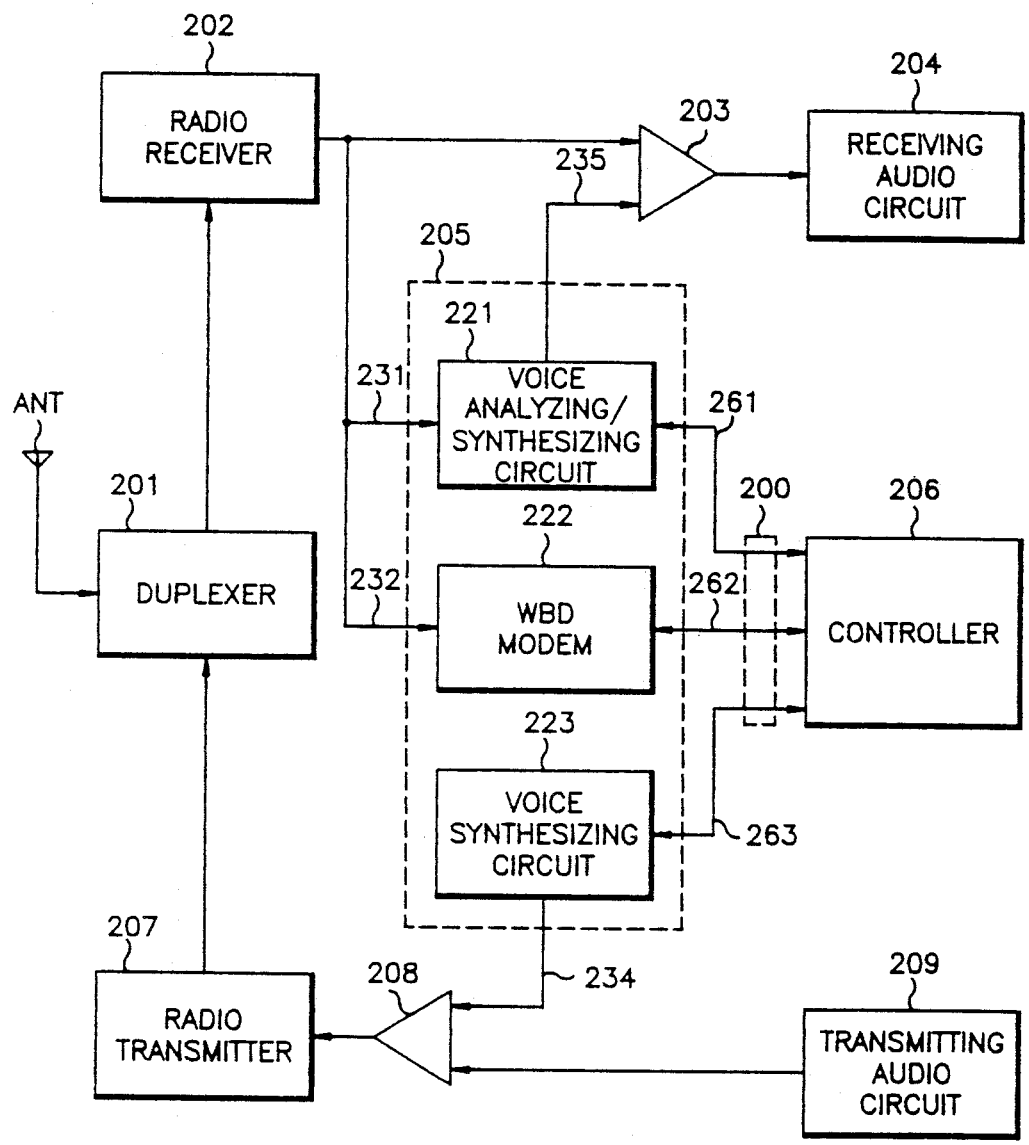
FIG. 2 is a block diagram of the circuit of the present invention.

Referring to FIG. 2, the inventive circuit comprises duplexer 201, a radio transmitter 207, a radio receiver 202, a voice analyzing and synthesizing circuit 221 a WBD modem 222, first adder 203, a voice synthesizing circuit 223, a controller 206, and second adder 208. The duplexer 201 permits alternate use of the same antenna for both transmitting and receiving. The radio transmitter 207 is connected with the duplexer 201, and transmits voice signals in a radio frequency (RF). The radio receiver 202 is also connected with the duplexer 201, and receives RF voice signals. The voice analyzing and synthesizing circuit 221 analyzes and synthesizes in an ADM procedure the voice signal received by the radio receiver 202. Connected with the radio receiver 202 is the WBD modem 222 to decode and convert into digital data the WBD of 10 kbps received by the radio receiver 202.

The voice signal outputted from the voice analyzing and synthesizing circuit 221 and the voice signal received by the radio receiver 202 are synthesized by the first adder 203 to produce an output to the receiving audio circuit 204. The voice synthesizing circuit 223 contains the answering voice message for reproducing it as a voice signal. The controller 206 controls voice analyzing/synthesizing circuit 221 and voice synthesizing circuit 223 to synthesize a given answering message according to an established mode by receiving the signal digitalized by the decoding of WBD modem 222. The second adder 208 adds the output answering message of voice synthesizing circuit 223 and the output voice signal of the transmitting audio circuit 209 to produce an output to radio transmitter 207.

The controller 206 contains a microprocessor or micom to control various parts of the car-phone system, and receives the commands inputted through a key pad by a car-phone user, thereby dealing with various processes and controlling telephone calls. The constructions and functions of the controller 206 and the car-phone key pad are as described in Korean patent application No. 87-5419.

In FIG. 3 are specifically illustrated the voice analyzing and synthesizing circuit 221 and the voice synthesizing circuit 223 according to the present invention. The controller 206 has first to third input/output lines 261-263. The voice analyzing/synthesizing section 242 of the voice analyzing and synthesizing circuit 221 is controlled by the signal through the first input/output line 261. The voice synthesizing section 252 of the voice synthesizing circuit 223 is controlled by the third input/output line 263. The signal through the second input/output line 262 enables the WBD modem 222 to digitalize the WBD data inputted through the second input terminal 232, thereby recognizing the caller's telephone number in the message mode 2.

The voice analyzing/synthesizing circuit 221 comprises second low pass filter 243, a voice analyzing/synthesizing section 242, second memory 241, and third low pass filter 244. The second low pass filter 243 is connected with the first input terminal 231 to eliminate the high frequency noise of the voice message outputted from the radio receiver 202. The first input terminal 231 serves the output terminal of the radio receiver 202. The voice analyzing and synthesizing section 242 stores voice characteristic parameters (amplitude, frequency number, tone information) analyzed and extracted by an adaptive delta modulation (ADM) procedure by receiving the voice signal through the second low pass filter 243 according to the control signal produced through the first input/output line 261 of the controller 206 so as to synthesize and reproduce the stored information by the ADM procedure according to the characteristic parameters. The second memory 241 stores the analyzed characteristic parameters of the voice message according to the control of the voice analyzing and synthesizing section 242. The third low pass filter 244 eliminates the high frequency noise from the voice signal reproduced from the voice analyzing/synthesizing section 242. The filtered signal is outputted through a first output line 235 to the first adder 203.

The voice synthesizing circuit 223 is operated in the control mode of central processing unit (CPU) according to the control signal inputted through the third input/output line 263 of the controller 206. The voice synthesizing section 252 of the voice synthesizing circuit 223 comprises a timing pulse generating circuit for controlling each operation from a basic clock pulse to a frame period, an interface between the controller and memory integrated circuit, a decoding ROM for decoding each characteristic parameter into 10 bits, a RAM for storing each decoded parameter, a linear interpolator for quasi-linear interpolating each characteristic parameter into a sub-frame unit, a sounding source circuit for generating voiced and voiceless sounds, a stack for temporarily storing characteristic parameters, a multiplier, an adder, a substractor, a digital filter, and a digital/analog converter for directly applying the synthesized voice data to an analog amplifier. Thus, the voice synthesizing section 252 synthesizes the voice data of an arbitrary address to produce voices.

The first memory 251 fixedly stores the message voice data to produce the voice data according to the signal specified by the voice synthesizing section 252. The first low pass filter 253 eliminates the sampled high frequency noise from the message voice signal produced by the voice synthesizing section 252 to be inputted through the second output line 234 to the second adder 208. The construction described with reference to FIGS. 2 and 3 is available as an option board controlled by the controller 206. The controller 206 controls all the functions of the car-phone.

An embodiment of the present invention will now be explained with reference to FIGS. 2 and 3. At first, the desired answering message modes are established into predetermined memory regions of the controller 206 by keyboard (not shown in the drawings). The contents of the answering messages of the three answering message modes 1-3 message modes are as follows:

MODE 1

Hello, this is the number \*\*\*-\*\*\*\*. I'm sorry, but he or she is not in. If you would like to speak to him or her, please contact the number \*\*\*-\*\*\*\*.

MODE 2

Hello, this is the number \*\*\*-\*\*\*\*. I'm sorry, but he or she is not in. After a signal tone, please push the keys of your telephone number and the key \* successively. He or she will return your call to the telephone number now stored. Thank you.

MODE 3

Hello, this is the number \*\*\*-\*\*\*\*. I'm sorry, but he or she is not in. After a signal tone, please push the key # and leave your voice message.

The messages of the answering modes 1-3 are stored into the first memory 251 of the voice synthesizing circuit section 223. Thus, if the keyboard is operated to establish one of the message modes, the selected mode is programed into a predetermined region of the memory of the controller 206. Additionally, the controller 206 is always checking whether the board for automatic answering of the present invention is mounted to establish a message mode.

The WBD signal to call up a car-phone which is inputted through the antenna is received by the radio receiver 202 through the duplexer 201, decoded by the WBD modem, and digitalized. Since the WBD modem 222 is always enabled by the controller 206 to receive the WBD signal received by the radio receiver 202, the decoded signal of the WBD modem 222 is processed by the controller 206. The WBD signal inputted for the car-phone called makes the called car-phone ring a predetermined number of times through the controller 206. When a predetermined time has passed from the car-phone starting to ring or when the car-phone is set in automatic message mode due to the user's absence the controller 206 generates the command to control the voice synthesizing section 252 of the circuit 223 so as to transmit the content of the selected message mode. Namely, the controller 206 controls the voice synthesizing section 252 through the third input/output line 263. The voice synthesizing section 252 generates the address signal to designate the selected message mode according to the control signal of the controller 206. The address signal generated by the voice synthesizing section 252 to designate the selected message mode is inputted into the first memory 251, thereby the voice message data of the selected mode is read out.

The voice synthesizing section 252 synthesize the voice message data according to the synthesizing conditions given successively, thereby outputting a voice signal. The voice signal from the voice synthesizing section 252 is divested of high frequency noise through the first low pass filter 253. The output from the first low pass filter 253 is added by second adder 208, and adapted to be transmitted by radio transmitter 207, thereby being outputted through the duplexer 201 and the antenna to the caller's telephone. It is assumed that the caller's telephone has the same construction as shown in FIGS. 2 and 3. Hence, the voice message from the transmitter is received by the radio receiver 202 through the antenna and the duplexer 201. After being suitably amplified, the amplified voice message signal is added by the first adder 203, and inputted to the receiving audio circuit 204. Therefore, the caller can recognize the voice message announcing the called party's absence.

If the answering voice message is not set in the mode 1, but in the mode 2 or 3, the caller will leave his telephone number or message for the called party. If the mode 1 is set, the caller's dialed WBD signal received by the radio receiver 202 through the duplexer 201 is digitalized by the WBD modem 222. If the controller 206 recognizes the digitalized signal, and identifies the mode 1, it generates a control signal through the third input/output line 263 to the voice synthesizing section 252 of the voice synthesizing circuit 223. The voice synthesizing section 252 generates the address signal to designate the message mode 1 of the first memory 251. The designated voice data is read out from the first memory 251. The voice signal data is used to synthesize a voice by the voice synthesizing section 252 according to the synthesizing condition, thereby inputting into the first low pass filter. The synthesized voice signal is divested of the sampled high frequency noise through the first low pass filter 253. The voice signal from the low pass filter is added by the adder 208 and transmitted by the radio transmitter 207 through the duplexer 201 and the antenna. Hence, the caller will hear the receiver's message of the mode 1, and be informed of where the receiver is. Thus, in case of emergency, the user can contact the caller by dialing the informed number.

When the message mode 2 is set in the controller 206, the signal processing is as follows: When called, the WBD signal is received by the radio receiver 202 through the antenna and the duplexer 201, and digitalized by the WBD modem 222. The controller 206 recognizes the digitalized signal, checks whether the message mode 2 is set, and generates a control signal to the voice synthesizing section 252 of the voice synthesizing circuit 223. The voice synthesizing section 252 generates according to the control signal the address signal to read the voice data of the mode 2 from the first memory 251. The voice data of the mode 2 from the first memory 251 is used to synthesize a voice by the voice synthesizing section 252 according to the synthesizing conditions. The synthesized voice signal is filtered through the first low pass filter 253. The voice signal from the first low pass filter 253 is added by the second adder 208, and transmitted by the radio transmitter 203 through the duplexer 201 and the antenna. After receiving the voice message of the mode 2, the caller pushes the keys of his telephone number and the key \*. Then, the caller's entered signal is received by the radio receiver 202 through the antenna and the duplexer 201, and digitalized by the WBD modem 222. The controller 206 processes the digitalized signal to store the inputted telephone numbers into predetermined regions of the memory and display the number of the telephone numbers received on the display. Then, if the person called up, upon returning from their absence, pushes the key RCL to retrieve the stored telephone number, it is presented on the display (not shown). Thus, the user can dial the displayed number to speak to the caller.

When the message mode 3 is set in the controller 206, the signal processing is as follows: Receiving the decoded digital data from the WBD modem 222, if it is the calling signal for the car-phone, the controller 206 controls the voice synthesizing section 252 of the voice synthesizing circuit 223 according to the control signal applied to the voice synthesizing section 252 of voice synthesizing circuit 223. The voice synthesizing section 252 controls the first memory 251 to generate the address signal. By the control of the address signal, the voice data of the mode 3 is from the first memory 251.

The voice data read out from the first memory 251 is used for the voice synthesizing section 252 to synthesize a voice signal which is converted into an analog voice signal and filtered through the first low pass filter 223. The signal of the message mode 3 is added by the second adder 208, and transmitted by the radio transmitter 207 through the duplexer 201 and the antenna. Receiving the voice message of the mode 3, if the caller pushes the key #, the DTMF signal received by the radio receiver 202 is decoded by the WBD modem 222 and converted into a digital data. The controller 206 checks the digitalized data to generate the control signal through the first input/output line 261. The control signal is inputted into the voice analyzing and synthesizing section 242 of the voice analyzing/synthesizing circuit 221.

Receiving the control signal from the controller 206, the voice analyzing and synthesizing section 242 designates the second memory 241 into write mode. The caller's message received by the radio receiver 202 is inputted into the second low pass filter 243 of the voice analyzing synthesizing circuit 221. The message signal is divested of the high frequency noise through the second low pass filter 243 and inputted into the voice analyzing/synthesizing section 242, which analyzes the message in an ADM procedure, and converts it into digital data, thereafter storing it into the second memory 241. The number of the voice messages stored is presented on the display.

The called party, upon returning from their absence, pushes the desired keys (message+*) to retrieve the stored voice message, then, the controller 206 checks the pushed keys to generate a control signal to the voice analyzing and synthesizing section 242 of the voice analyzing/synthesizing circuit 221. Receiving the control signal, the voice analyzing/synthesizing circuit 242 sets the second memory 241 into read mode. Then, the voice analyzing and synthesizing section 242 reads out the voice message data from the second memory 241 to synthesize the data by an ADM procedure into a voice signal, thereafter being converted into an analog signal. The synthesized voice message is divested of unnecessary signals such as the sampled high frequency noise through the third low pass filter 244, and inputted into the receiving audio circuit 204 through the first adder 203. Receiving the control signal, the voice analyzing/synthesizing section 242 sets the second memory 241 into the read mode. Accordingly, the user can receive the message easily. Namely, even if the user is absent, the inconvenience due to the absence can be eliminated by previously selecting the mode 1 to mode 3.

Figure 4A:
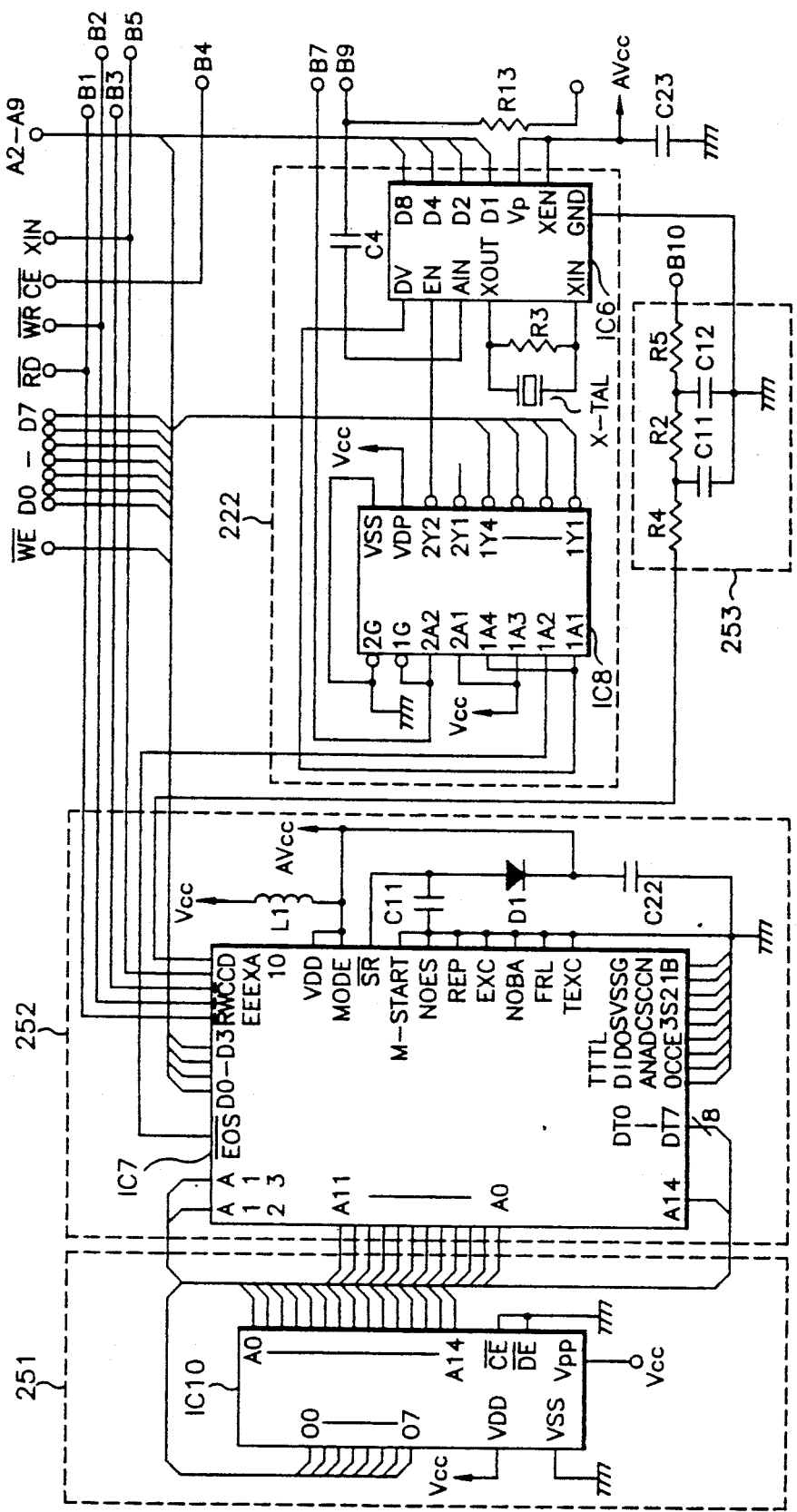

Referring to FIGS. 4(A)–(D) showing schematic diagrams of the circuit of FIG. 3 in accordance with the present invention, FIG. 4(A) illustrates specifically the first memory 251, the voice synthesizing section 252, and the first low pass filter 253 of the WBD modem 222 and the voice synthesizing circuit 223 of FIG. 3. IC10 is an EPROM serving as the first memory 251, and stores the voice data of the modes 1–3. The address buses A0–A14 of the EPROM IC10 are connected with the address buses A0–A14 of the voice synthesizing integrated circuit IC7. The output terminals O0–O7 of the EPROM IC10 are connected with the data input terminals DT1–DT7 of the voice synthesizing integrated circuit IC7. According to the address signal outputted from the voice synthesizing integrated circuit IC7 to one of the voice message modes 1–3 is selected to generate the voice message data.

The selected voice message data is inputted into the data input terminals DT0–DT7 of the voice synthesizing integrated circuit IC7, so that a voice is synthesized by the LPC synthesizing procedure. The voice synthesizing integrated circuit IC7 is available by the identification No. KS5901A developed by the Samsung Electronic Company. The KS5901A has two applications of CPU mode and manual mode. The CPU mode uses a microcomputer or microprocessor to control the voice synthesizing section 252, which is employed for the present invention. The manual mode is to control all the functions and the synthesizing conditions by external switches. The functions and characteristics of the KS5901A are more detailed in pages 111–114, The Electronic Science Journal, June, 1987, and in the pages 185–203, The Data Book published by the Samsung Electronic Company.

An inductor L1 and a capacitor C11 connected with the voice synthesizing integrated circuit IC7 is the decoupling circuit to eliminate the power source noise. Diode D1 and Capacitor C22 is a circuit for supplying a reset signal automatically to the voice synthesizing integrated circuit IC7.

The first low pass filter 253 comprises two subordinate filters connected in series with each other. The first subordinate filter consists of a resistor R4 and a capacitor C11, and the second subordinate filter of a resistor R3 and a capacitor C12. These subordinate filters are connected with the 9 bit R-2R D/A (digital/Analog) converting output terminal of the voice synthesizing integrated circuit IC7. Thus, the synthesized voice divested of the high frequency noise is outputted to node B10 through resistor R5.

The WBD modem 222 has the node B9 for receiving the caller's voice message and the WBD signal, is connected with the analog input terminal AIN of the DTMF receiver IC6, and converts the received WBD signal into digital data to input it into the controller 206 through the data lines D1, D2, D4 and D8. The DTMF receiver IC6 is enabled by the output of the bus driver IC8.

The bus driver IC8 is enabled by the chip selecting ($\overline{CS}$) control signal of the node B7 outputted from the address decoder (not shown) of the controller 206. The controller 206 checks the state signal of data valid terminal DV produced when the WBD signal received by the DTMF receiver IC6 is validated to be suitable and the output signal of End-of-Speech signalling terminal $\overline{EOS}$ produced from the voice synthesizing integrated circuit IC7, and receives the suitable digital signal. Namely, the controller 206 not only receives the WBD signal through the data lines D4–D7 of the DTMF receiver IC6, but also enables the DTMF receiver IC6. The crystal oscillator X-TAL connected with the DTMF receiver IC6 supplies basic clock pulses to the DTMF receiver IC6.

Figure 4B:
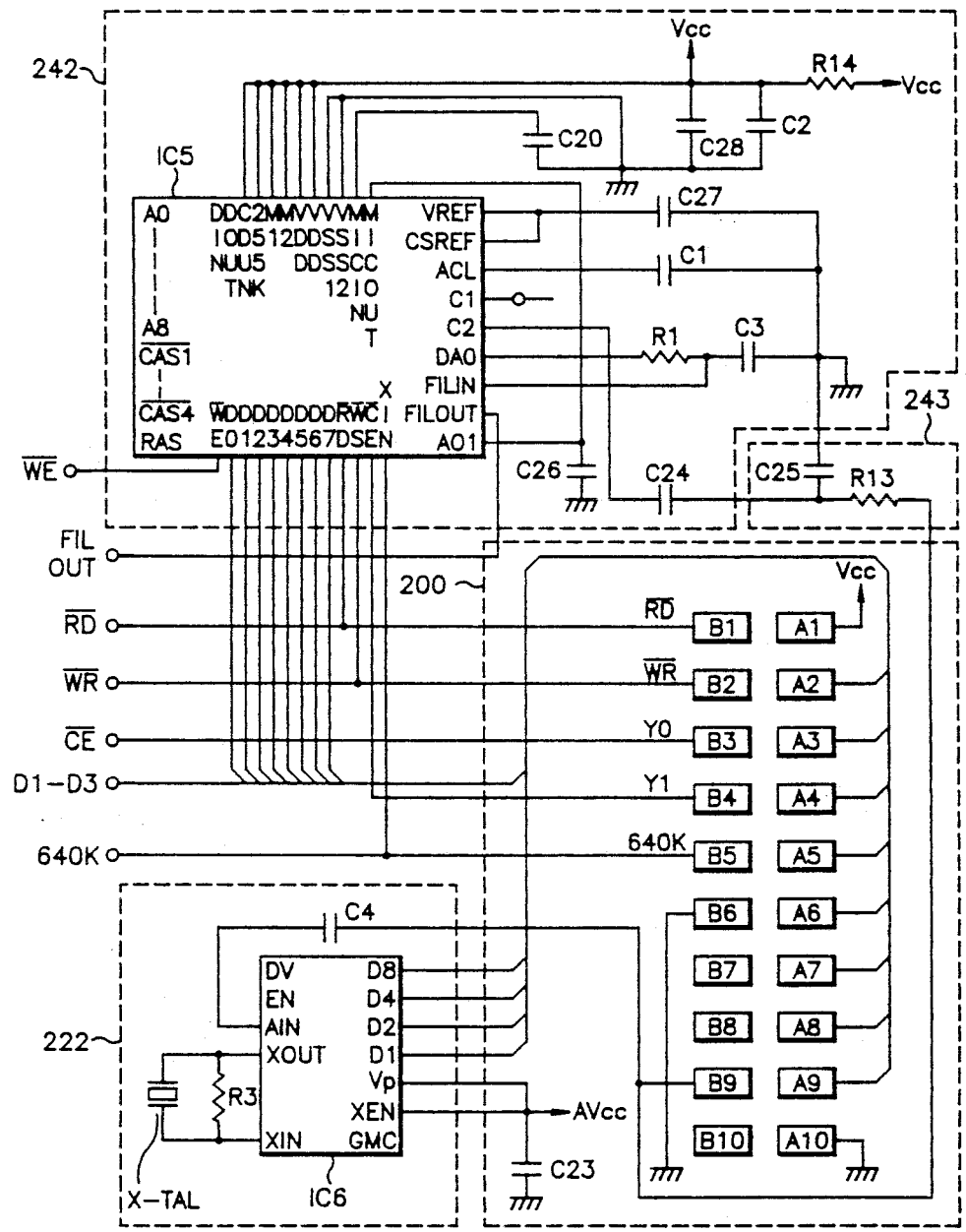

FIG. 4(B) specifically illustrates the construction of each node A1–A10 and B1–B10 connected via I/O interface 200 with the controller 206 shown in FIG. 2. B1 and B2 are connected with the read and write terminal $\overline{RD/WR}$ of the CPU of the controller 206, the read/write controlling terminal $\overline{RD/WR}$ of voice recording/reproducing integrated circuit IC5, and the read/write enabling terminal $\overline{\text{RE/WE}}$ of the voice synthesizing integrated circuit IC7 so as to generate control signals to read or write voice data from or into each voice data memory for voice analyzing and synthesizing. Node B3 is connected with the chip enabling terminal $\overline{\text{CE}}$ of the voice synthesizing integrated circuit IC7, while node B4 is connected with the chip enabling terminal $\overline{\text{CE}}$ of the voice recording/reproducing integrated circuit IC5, so that the controller 206 enables the integrated circuits.

Node B5 is connected with the clock terminals XIN, CX1 of the voice synthesizing integrated circuit IC7 and the voice storing/reproducing integrated circuit IC5 to receive the basic clock pulse of 640 KHz generated by the controller 206. Node B6 is grounded. Node B7 is connected so that the enabling signal produced from the controller 206 is inputted into the bus driver IC8 when the WBD signal is read out. Node B8 is the message output line used to reproduce the stored signal during the called party's absence. Node B9 is the line to input the WBD signal and the caller's message received by the radio receiver 202. Node B10 is the line used to transmit a signal through the voice synthesizing integrated circuit IC7 and the first low pass filter 253.

Node A1 is connected with the power source Vcc, and Node A10 grounded. Nodes A2-A9 are connected with the data buses D0-D7 of the CPU of the controller 206 to input into the voice synthesizing integrated circuit IC7 the data for the interface of the CPU command and the data for monitoring the state flag X0 and for reading the external ROM data. The data output terminals D1, D2, D4 and D8 of the bus driver IC8 and the DTMF decoder IC6 are connected with the data buses D0-D3 to receive control signals and data according to the DTMF signal receiving, and with the data lines D0-D7 of the voice storing/reproducing integrated circuit IC5 to input data at the CPU control mode of the controller 206. Namely, data and command between the CPU of the controller 206 and the voice storing/reproducing integrated circuit IC5 can be bidirectionally transmitted. Additionally, between the voice signal input terminal C2 of the voice storing/reproducing integrated circuit IC5 and the node B9 (see FIG. 4B) is connected the second low pass filter 243. The second low pass filter comprises a resistor R13 connected with the node B9, and a capacitor C25 connected in parallel with the resistor R13 to filter the inputted voice signal by the low pass filter.

The capacitors C1 and C27 are used to stabilize the reference voltage for the input voice signal. The capacitor C24 is used to couple the internally mounted microphone amplifier. Besides, the resistors R14, R1 and the capacitors C2, C3, C20, C25 are the fundamental elements used for the voice storing/reproducing integrated circuit IC5. An example of the integrated circuit IC5 is T6668 of Japan Toshiba Company.

Figure 4C:
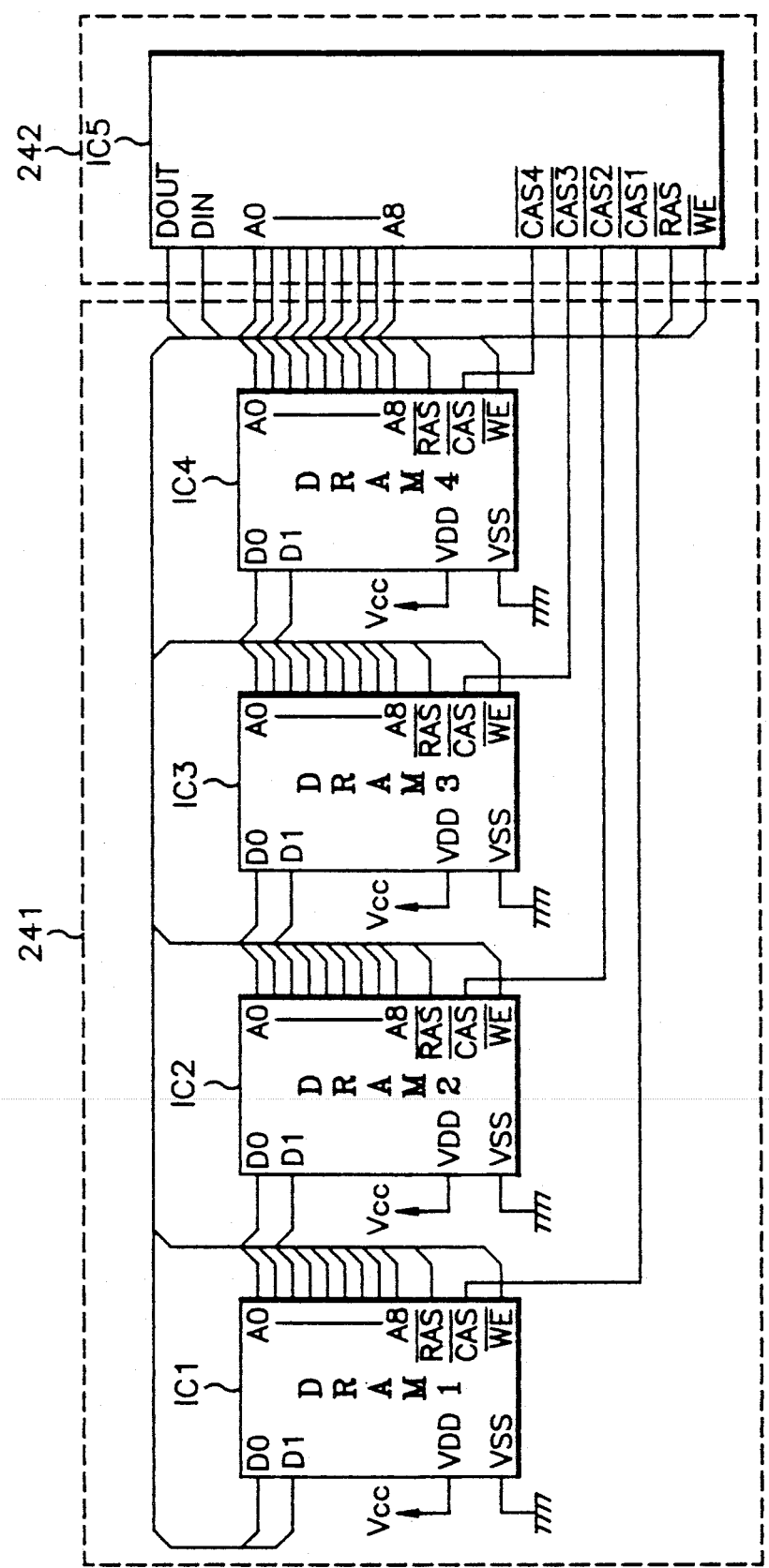

FIG. 4(C) specifically illustrates the construction of the second memory 241 as shown in FIG. 3, in accordance with the present invention.

The data input/output terminals Dout and Din, the address buses A0-A8 and the write enabling terminal $\overline{\text{WE}}$ are common by using four DRAMs DRAM1–DRAM4. Also, the row address strobe terminal $\overline{\text{RAS}}$ is common. The column address strobe terminal $\overline{\text{CAS}}$ is connected with $\overline{\text{CAS1}}$-$\overline{\text{CAS4}}$ respectively so as to be controlled by the voice storing/reproducing integrated circuit IC5. The data input/output terminals D0 and D1 of the DRAMs DRAM0-DRAM4 are connected with the data input/output terminals Din and Dout of the voice storing/reproducing integrated circuit IC5. Through the data input/output terminals Din and Dout the caller's message is inputted into the voice storing/reproducing integrated circuit IC5 to analyze and store the message into the DRAM1-DRAM4 through the data output terminal Dout. When reproducing, the caller's message is read out through the data input terminal Din of the DRAM1-DRAM4, being synthesized to produce a voice message by the voice storing/reproducing integrated circuit IC5.

Figure 4D:
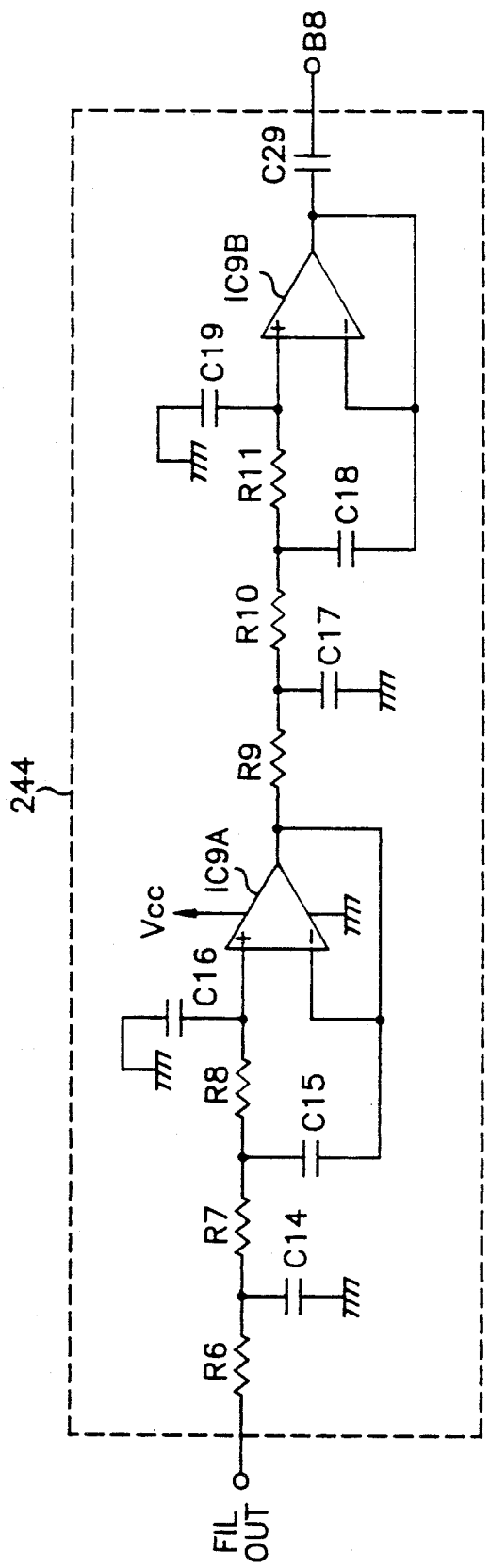

FIG. 4(D) specifically illustrates the circuit of the third low pass filter 244 as shown in FIG. 3, in accordance with the present invention. The third low pass filter 244 comprises three subordinate filters connected in series with each other. From the voice signal output terminal FILOUT of the voice storing/reproducing integrated circuit IC5 are successively connected resistor R6, capacitor C14 and resistor R7, capacitor C15 and resistor R8, and capacitor C16, thereby resulting in a three stage low pass filter whose output is applied to the non-inverting input terminal (+) of operational amplifier IC9A. From the output terminal of the operational amplifier IC9A are successively connected resistor R9, capacitor C17, resistor R10, capacitor C18, resistor R11, and capacitor C19. With the output terminal of the three stage low pass filter is connected a capacitor C29, which is connected with the node B8 to output the stored message. Namely, the node B9 is connected with the lines 231, 232 of FIG. 3, the node B8 with the line 235 of FIG. 3, and the node B10 with the line 234 of FIG. 3.

FIG. 5 is the flow chart of establishing message modes according to the present invention. The method for establishing voice message modes comprises the steps of:
a first step for checking the command of establishing the message mode;
a second step for inputting a message mode selecting key when said command indicates the message mode establishment;
a third step for establishing the message mode 1 only provided the telephone number to be informed of is stored when the mode selecting key indicates mode 1;
a fourth step for establishing the message mode 2 when the mode selecting key indicates mode 2;
a fifth step for establishing the message mode 3 when the mode selecting key indicates mode 3; and
a sixth step for inputting again a message mode selecting signal when the mode selecting signal does not indicate any of the modes 1 to 3.

The message modes 1-3 are established by the controller 206 through operating the keyboard, and the display presents the programmed telephone number and the selected message mode.

FIG. 6 is the flow chart of the message being outputted according to the present invention. The method for outputting a voice message comprises the steps of:
a first step for checking the establishment of automatic answering function when called up;
a second step for transmitting the content of the message mode 1 when the establishment of the message mode 1 is identified;
a third step for answering the content of the message mode 2 and storing the data of the caller's telephone number when the establishment of the message mode 2 is identified;

a fourth step for closing the communication when the key * is pushed after storing the data; and a sixth step for transmitting the content of the message mode 3 when the establishment of the message mode 3 is identified and storing the caller's voice message when the key # is pushed on.

FIG. 7 is the flow chart of the message modes 1-3 in FIG. 6 being transmitted according to the present invention. The method for transmitting the message modes 1-3 comprises the steps of:

a first step for checking the end of speech by the voice synthesizing integrated circuit IC10;

a second step for checking the end of the stored message when the end of the speech is checked;

a third step too returning the process for carrying out the other functions when the end of the stored message is detected or for loading the next index address into the voice synthesizing section to read out the data of the stored condition and the sentence address from the voice synthesizing section when the end of the stored message is not detected;

a fourth step for synthesizing the voice message by reading out the data from the memory storing the voice message by designating the data of condition and the sentence address according to the synthesizing of the voice synthesizing section; and a sixth step for outputting a start command to the voice synthesizing section so as to transmit the voice signal.

FIG. 8 is the flow chart of the message recording of FIG. 6 according to the present invention. The method for storing the message comprises the steps of:

transferring the command to start storing the caller's message to the voice analyzing and synthesizing section when the signal of the key # is received after transmitting the content of the message mode 3 when called up;

storing the caller's message;

checking whether the communication is ended and whether the message storing time has passed 20 seconds;

transferring the stopping command to the voice analyzing/synthesizing section when the communication is ended or when the message storing time has passed 20 seconds; and calculating the number of messages recorded to store and display it.

FIG. 9 is the flow chart of the message reproducing according to the present invention.

If the person called, returning from their absence, wishes to hear the stored voice message, he can recognize the number of the stored voice messages on the display, and push the message key MSG and the key *. If the message key MSG and the key * are pushed once, the first stored message is retrieved, and when the keys are pushed twice, the second stored message is retrieved. Here, the method for retrieving the voice message comprises the steps of:

transferring the retrieving command to the voice analyzing and synthesizing section by controlling the signal of the message key MSG and the key * with the controller 206 to retrieve the voiced message;

checking for the end of the caller message retrieving process; and transferring the stopping command to the voice analyzing/synthesizing section when the message retrieving process is ended.

A preferred embodiment of the present invention will now be described in more detail with reference to FIGS. 4-9.

The EPROM IC10 as shown in FIG. 4(A) is used, which already stores the voice data for the modes 1-3. If the predetermined key is pushed, one of the modes 1-3 of FIG. 5 is established by controlling of the controller 206. Particularly, for the message mode 1 must be beforehand stored the telephone number on which the person called up may communicate with the caller. The display presents the stored telephone number.

If the message selecting key MSG+1 is pushed, the controller 206 checks the key in the step 5a of FIG. 5. If the step 5c indicates the message mode 1, it is checked whether the telephone number on which the person called can communicate with the caller has been checked in the step 5d of FIG. 5. If the telephone number is stored, the controller 206 of FIG. 2 establishes the message mode 1 in the step 5e. Then, the display presents MS1.

When the key for selecting the message mode 2 MSG+2 is pushed in the step 5b, the mode 2 is checked in the step 5g and set in the step 5h. Then, the display presents MSG2.

When the key for selecting the message mode 3 MSG+3 is pushed in the step 5c, the mode 3 is checked in the step 5i, and set into the memory of the controller 206. Then, the display presents MSG3. Thus, the message mode is set.

When the carphone is called up in the step 6a, it is checked in the step 6b whether the mode for automatic answering function is set. Namely, it is checked which of the modes 1-3 is set. For example, the answering message mode 1 being set, in the step 6c the call is answered with the message content of the EPROM IC10 which reads as follows:

"Hello, this is the number *-. I'm sorry, but he or she is not in. If you would like to speak to him or her, please contact the number *-****."

Transmitting of the message of the answering mode 1 will now be explained in detail. The bus driver IC8 receiving the state signal produced through the End-of-Speech (EOS) terminal of the voice synthesizing integrated circuit IC7 as shown in FIG. 4(A), the controller 206 checks whether the state signal is EOS.

The EOS signal is generated for each of the numbers and each of the word phrases. For example, in the mode 1, the EOS signal is generated for the phrase "Hello, this is the number", each of the symbols *- indicating the telephone number, the phrase "I'm sorry, but he or she is not in", the phrase "If you would like to speak to him or her", the phrase "please contact the number", and each of the numbers *-****. Hence, all the EOS signals generated yield a total of 18 EOS's.

In order to store the EOS signals into the EPROM IC10, the chip selecting of the voice synthesizing integrated circuit IC7 is made through the node B3 of the controller 206, and the basic clock pulse of 640 KHz is inputted through the node B5 into the voice storing/reproducing integrated circuit IC5 and the voice synthesizing circuit IC7 as shown in FIG. 4(A). The signal generated through the node B1 enables the read enabling terminal $\overline{RE}$ of the voice synthesizing integrated circuit IC7 to sense the terminal EOS. When the EOS signal is sensed in the step 7a, in the step 7b is checked the End-of-Message Table set during the establishment of message mode.

If the EOMT (End-of-Message Table) is checked in the step 7b, the process is returned for carrying out the other functions, but if not EOMT, in the step 7c is activated the write enabling terminal $\overline{WE}$ of the voice synthesizing integrated circuit IC7. Through the data buses D0-D3 connected with the nodes A2-A5 is loaded the data for writing command into the voice synthesizing integrated circuit IC7 to designate the next index.

In the step 7d, the CPU of the controller 206 controls the read enabling terminal $\overline{RE}$ of the voice synthesizing integrated circuit IC7 to read therefrom the data for conditioning the voice synthesizing. The controller receives the parameter data for the voice synthesizing from the voice synthesizing integrated circuit IC7, and establishes the parameter characteristic information according to the program to input the conditioning and designating data into the voice synthesizing integrated circuit IC7. The integrated circuit IC7 controls the EPROM IC10 according to the conditioning and designating data to read the data for the mode 1 and synthesize it in the LPC procedure.

In the step 7f, the controller 206 applies the starting command to the voice synthesizing integrated circuit IC7 to output the synthesized voice signal. Then, the voice signal including the EOS signals is successively synthesized during the program loop of FIG. 7. Namely, until the bit corresponding to the end of the message table in the step 7b is checked, the message voice is synthesized and outputted.

The voice signal synthesized by the voice synthesizing integrated circuit IC7 passes the first low pass filter 253 comprising the two stages of resistor R4-capacitor C11 and resistor R2-capacitor C12 as shown in FIG. 4(A), being divested of the high frequency noise produced during voice synthesizing. The input/output system function for the first low pass filter 253 is as follows:

$$\frac{V_o(S)}{V_i(S)} = \frac{1}{R_4 R_2 C_{11} C_{12} S^2 + S(R_4 C_{11} + R_2 C_{12} + R_4 C_{11}) + 1} \quad (1)$$

$$= \frac{B}{S^2 + AS + B} \left( A = \frac{R_4 C_{11} + R_2 C_{12} + R_4 C_{11}}{C_{11} C_{12} R_4 R_2} \right)$$

$$\left( B = \frac{1}{C_{11} C_{12} R_4 R_2} \right)$$

substituted by the frequency response $$S = jw$$

$$\frac{V_o(jw)}{V_i(jw)} = \frac{B}{-w^2 + Ajw + B} = \frac{B}{(B - w^2) + Ajw} \quad (2)$$

$$= \frac{B(B - w^2)}{(B - w^2)^2 + A^2 w^2} - j\frac{ABw}{(B - w^2)^2 + A^2 w^2} =$$

$$\alpha + j\beta$$

$$\alpha = \frac{B(B - w^2)}{(B - w^2)^2 + A^2 w^2}$$

$$\beta = \frac{ABw}{(B - w^2)^2 + A^2 w^2}$$

$$\left|\frac{V_o(jw)}{V_i(jw)}\right| = (\alpha^2 + \beta^2)^{\frac{1}{2}} = \quad (3)$$

$$\left[\left(\frac{B(B - w^2)}{(B - w^2)^2 + A^2 w^2}\right)^2 + \left(\frac{ABw}{(B - w^2)^2 + A^2 w^2}\right)^2\right]^{\frac{1}{2}}$$

In the Eqs. (1)-(3), the resistor R4 is selected to have the value of 1.2KΩ, the resistor R1 of 12KΩ, and the capacitors C11 and C12 of 4700PF, so that the cut-off frequency of 3.3 KHz and two poles are obtained for the inventive characteristic.

The signal which has passed the first low pass filter is outputted through the node B10 connected with the line 234. The outputted signal is transmitted to the duplexer 201 and the antenna through the second adder 208 and the radio transmitter 207 as shown in FIG. 2. For example, the caller's telephone being the inventive carphone, the received signal flows in the order antenna→duplexer 201→radio receiver 202→first adder 203→receiving audio circuit 204.

Likewise, the mode 2 being set, the controller 206 controls in the step 6d the voice synthesizing integrated circuit IC7 of FIG. 4(A) to transmit the content of the EPROM IC10 which reads as follows:

"Hello, this is the number *-**. I'm sorry, but he or she is not in. After a signal tone, please push the keys of your telephone number and the key * successively. He or she will return your call to the telephone number now stored. Thank you."

The message of the mode 2 is also synthesized according to the flow chart of FIG. 7. Likewise, in mode 2, the EOS signal is generated for each of the numbers and each of the word phrases. For example, the EOS signal is generated for the phrase "Hello, this is the number", each of the symbols *-** indicating the telephone number, and the phrase "I'm sorry, but he or she is not here. After a signal sounding, please push the keys of your telephone number and the key * successively. He or she upon returning will return your call to the telephone number now stored. Thank you". Hence, all the EOS signals generated total 10.

If the answering mode 2 is set, the flag is set to check the end of the message table, and the controller 206 successively checks the generation of the EOS signal according to the flow chart of FIG. 7. After transmitting the content of the answering mode 2 message if the caller's telephone number is inputted, the DTMF receiver ICG receives the telephone number as the WBD signal from the node B9 within a predetermined time, and digitalizes it. The digitalized signal is inputted into the controller 206, whose state is recognized in the step 6h.

In the step 6h, the key input being recognized, the controller 206 stores the value of the key input into a predetermined region thereof, and terminates the communication in the step 6k regardless of the caller's hook-on/off state if the key * is inputted in the step 6j. Finally, the controller 206 presents the number of the telephone calls stored on the display. If the person called, returning from their absence, pushes the recalling key RCL and the key X+Y, the controller 206 recognizes the key signals and presents in sequence the stored telephone numbers on the display.

Likewise, the answering mode 3 being set, the controller 206 controls in the step 6e the voice synthesizing integrated circuit IC7 to transmit the content of the EPROM IC10 which reads as follows:

"Hello, this is the number \*\*\*-\*\*\*\*. I'm sorry, but he or she is not in. After a signal tone, please push the key # and leave your message within 20 seconds. Thank you."

The content of the answering mode 3 message is loaded into the voice synthesizing integrated circuit IC7, which synthesizes the signal to be transmitted in a LPC procedure. Hearing the transmitted signal, if the caller pushes the key # within 20 seconds, the controller 206 recognizes the key # signal inputted through the DTMF receiver IC6, controlling the voice storing/reproducing integrated circuit IC5 in the analyzing mode. The method of establishing the storing mode of the voice storing/reproducing integrated circuit IC5 will be specifically explained with reference to FIG. 8. The steps 8a–8d are the same processing as the steps 6a, 6b, 6e, 6l, 6m of FIG. 6. The controller 206 recognizing the key # in the step 8d, the voice storing/reproducing integrated circuit IC5 receives the starting command to store the voice message in the step 8e.

After the voice storing/reproducing circuit IC5 is designated to the storing mode to store the voice message, the controller 206 checks in the steps 8g and 8h whether the communication has been terminated and the storing time has passed 20 seconds. In the steps 8g and 8h, the program tests whether communication is terminated and whether the storing time has passed 20 seconds. The controller 206 transmits the stopping command to the voice storing/reproducing integrated circuit IC5, and calculates the number of the stored messages to present it on the display. The caller's voice message is filtered through the second low pass filter 243 comprising the resistor R13 and the capacitor C25 as shown in FIG. 4(B), being analyzed by the voice storing/reproducing integrated circuit IC5 in the ADM procedure.

The voice data analyzed and digitalized by the voice storing/reproducing integrated circuit IC5 is stored into the DRAMs 1-4. The DTMF signal inputted through the node B9 is digitalized and inputted into the controller 206. The controller 206 checking for the calling signal in the step 6a, it checks in the step 6b whether the answering message mode 3 is established. If the mode 3 is established, the voice message of the mode 3 is read out from the EPROM IC10 according to the flow chart of FIG. 7 in the step 6e, and synthesized by the voice synthesizing circuit IC7 in an ADM procedure and transmitted to the caller.

Hearing the transmitted signal, the the caller may push key # within 20 seconds to leave a message. Then, it is checked whether the controller 206 has received the key # signal in the manner such as the DTMF signal recognizing method, in the step 6e. The controller 206 recognizing the key # input, the chip selecting of the voice storing/reproducing integrated circuit IC5 is made through the node B4. Thereafter, if the system clock pulse of 640 KHz is inputted through the node B5, and through the node B2 is inputted the high signal into the write controlling terminal $\overline{WR}$ of the voice storing-/reproducing integrated circuit IC5, the circuit IC5 is designated to the storing mode as shown in FIG. 8, storing the messages and presenting the storing numbers of the messages on the display.

When designating the storing mode, through the nodes A2–A9 is inputted the command data for the voice synthesizing of the voice storing/reproducing integrated circuit IC5 from the data buses D0–D7. The voice signal through the node B9 is filtered through the second low pass filter 243 comprising the resistor R13 and the capacitor C25 as shown in FIG. 4(B). The input/output system function of the low pass filter is obtained as follows:

$$\frac{V_o(S)}{V_i(S)} = \frac{1}{R_{13}C_{25} + 1} = \frac{A}{S + A} \quad (4)$$

$$\left( A = \frac{A}{R_{13}C_{25}} \right)$$

substituted by the frequency response $$\frac{V_o(S)}{V_i(S)} = \frac{A}{A + jw} = \frac{A^2 - jAw}{A^2 + w^2} \quad (5)$$

$$\left| \frac{V_o(S)}{V_i(S)} \right| = \left[ \left( \frac{A^2}{A^2 + w^2} \right)^2 + \left( \frac{Aw}{A^2 + w^2} \right)^2 \right]^{\frac{1}{2}} = \quad (6)$$

$$\left\{ \frac{A^4 + A^2w^2}{(A^2 + w^2)^2} \right\}^{\frac{1}{2}}$$

In the above Eqs. (4)–(6), the value of the resistor R13 is selected to have 180KΩ, and the capacitor 220PF, so that the cut-off frequency of 3.3 KHz and two poles are obtained for the inventive low pass filter characteristic. The capacitors C1, C2, C24, C26, C27, and the resistor R1 are connected to stabilize the reference voltage of the operational amplifier and the SCF circuit mounted inside the voice storing/reproducing integrated circuit IC5. The voice storing/reproducing integrated circuit IC7 analyzes the caller's message in an ADM procedure, and converts it into a digital data. The converted message is stored into the DRAMs 1-4.

Activating the write enabling terminal $\overline{WE}$ and the row address strobe terminal $\overline{RAS}$ of the DRAMs 1-4 of FIG. 4(C), the analyzed voice data is stored into the designated regions of the DRAMs 1-4 by generating the address signal through the address buses A0–A8 depending on the selection of the column address strobe terminals CAS1–CAS4 (8f). In the steps 8g and 8h, when the caller hooks on/off the telephone or the storing time has passed 20 seconds, the communication is terminated.

The person called, returning from their absence, monitors the display by data processing according to the mode establishment as shown in FIG. 9. Then, the number of the messages stored is presented on the display. Pushing the message key MSG and the key \*, the controller 206 checks the key signal in the step 9a to transmit the starting command to the voice storing/reproducing integrated circuit IC5 in the step 9b.

The voice data stored into the DRAMs 1-4 which was received during the called party's absence is read and synthesized in the ADM procedure by the voice storing/reproducing integrated circuit IC5 in the step 9c. The controller 206 checks in step 9d whether the retrieving time is over. If the retrieving time is over, the controller 206 transmits the stopping command to the voice storing/reproducing integrated circuit IC5, thereby ending the reproducing procedure.

The synthesized voice signal of the voice storing/reproducing integrated circuit IC5 is outputted through the output terminal FILOUT to the low pass filter comprising the resistors R6, R7, R8 and the capacitors C14, C15, C16 in three stages as shown in FIG. 4(D), thereby being divested of the sampled noise first. The filtered signal is buffered through the operational amplifier IC9A, which signal passes through the low pass filter comprising the resistors R9, R10, R11, and the capacitors C17, C18, C19 in three stages, thereby being further divested of the sampled noise.

The third low pass filter 244 as shown in FIG. 4(D) has six poles and the cut-off frequency of 3.3 KHz. The filtered signal is buffered through the operational amplifier IC9B, and is transferred to the node B8 connected with the line 235 through the capacitor C29. The signal is received by the receiving audio circuit 204 through the first adder 203 as shown in FIG. 2, so that the message received during the called party's absence is reproduced.

As described above, the present invention employs the voice analyzing and synthesizing circuit which is not contained in the conventional automatic answering device, so that the caller's message received during the called party's absence can be stored. Furthermore, because the voice analyzing and synthesizing circuit consists of a semiconductor integrated circuit, the reliablility of the automatic answering device is improved.

The foregoing description shows only a preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. In a vehicle radio-telephone having an antenna, a receiving audio circuit and a transmitting audio circuit, an automatic answering device comprising:

duplexer means operably connected with said antenna for permitting common use of said antenna for both transmitting and receiving;

radio transmitter means operably connected with said duplexer means for transmitting, as radio frequency signals, voice signals input thereto, said radio transmitter means being operably connected with said duplexer means;

radio receiver means for receiving, as radio frequency signals input thereto, voice and dual tone multi-frequency (DTMF) signals, said radio receiver means being operably connected with said duplexer means;

voice analyzing and synthesizing circuit means operably connected with an output of said radio receiver means for analyzing and synthesizing, by an adaptive delta modulation (ADM) process, voice signals received from said radio transmitter means, for selectively recording and reproducing received radio-telephonic voice signals;

wide band data (WBD) modem means operably connected with an output of said radio receiver means for decoding and digitizing received radio-telephonic DTMF signals;

first adder circuit means operably connected with an output of said radio receiver means and an output of said voice analyzing and synthesizing circuit means and also with an input of said receiving audio circuit, for adding reproduced voice signals output by said voice analyzing and synthesizing circuit means and voice signals received by said radio receiver means to produce a voice signal output in accordance therewith to said receiving audio circuit;

voice synthesizing circuit means containing, in discrete stored digital data form, first, second and third answering messages each corresponding to a respective answering mode of said automatic answering device, for selectively reproducing said first through third answering messages as voice signals by a linear predictive coding (LPC) voice synthesis procedure;

second adder circuit means operably connected with an output of said voice synthesizing circuit means, an output of said transmitting audio circuit and an input of said radio transmitter means, for adding synthesized voice signals output by said voice synthesizing circuit means and voice signal outputs of said radio transmitter means for producing a voice signal output in accordance therewith to said radio transmitter means for radio-telephonic transmission; and controller means operably connected with said voice analyzing and synthesizing circuit means, said WBD modem means and said voice synthesizing circuit means, for controlling the voice synthesis and outputting of one of said first through third answering messages by said voice synthesizing circuit means corresponding to one of a first, second and third selectable answering modes, and in said first selectable answering mode, for controlling said voice synthesizing circuit means to synthesize said first answering message for informing a caller of a called party's absence and of a telephone number at which the called party may be called;

in said second selectable answering mode, for controlling said voice synthesizing circuit means to synthesize said second answering message for informing the caller of the called party's absence and requesting the caller to successively input DTMF key signals representing the caller's telephone number followed by a first DTMF key signal, and upon receiving from said WBD modem means, as a decoded and digitized signal, said DTMF telephone number signals and first DTMF key signal input by the caller in response to said second answering message, for storing the caller's input telephone number; and in said third selectable answering mode, for controlling said voice synthesizing circuit means to synthesize said second answering message for informing the caller of the called party's absence and requesting the caller to input a second DTMF key signal for permitting the caller to leave a voice message, and upon receiving from said WBD modem means, as a decoded and digitized signal, said second DTMF key signal input by the caller in response to said third answering message, for controlling said voice analyzing and synthesizing circuit means to record the caller's voice message.

2. The automatic answering device according to claim 1, wherein said controller means is operably connected with said voice analyzing and synthesizing circuit means by a first input/output line, with said WBD modem means by a second input/output line, and with said voice synthesizing circuit means by a third input/output line.

3. The automatic answering device according to claim 2, wherein said voice analyzing and synthesizing circuit means comprises:

first lowpass filter means connected to the output of the radio receiver means for eliminating high frequency noise in the voice signal output by said radio receiver means;

voice analyzing and synthesizing section means connected to said first lowpass filter means for outputting and inputting voice characteristic parameters analyzed and extracted from voice signals from said first lowpass filter means by an ADM procedure in accordance with a first control signal received on said first input/output line, for recording caller voice messages and for synthesizing said recorded caller voice messages by said ADM procedure in accordance with said characteristic parameters;

memory means connected with said voice analyzing and synthesizing section means for storing said analyzed and extracted characteristic parameters of the received voice signals under control of said voice analyzing and synthesizing section means; and second lowpass filter means connected with said voice analyzing and synthesizing section means and with an input of said first adder circuit means for removing high frequency noise from voice messages synthesized by said voice analyzing and synthesizing section means and for supplying a filter voice signal therefrom to said first adder circuit means.

4. The automatic answering device according to claim 3, wherein said first lowpass filter means is comprised of an RC circuit having a single pole and a cutoff frequency of 3.3 KHz.

5. The automatic answering device according to claim 3, wherein said second lowpass filter means has six poles and a cutoff frequency of 3.3 KHz.

6. The automatic answering device according to claim 3, wherein said second lowpass filter means is comprised of a first three subordinate lowpass filter stages connected in series, an output of which series-connected first three subordinate lowpass filter stages is operably connected with an input of a first buffer circuit, a second three subordinate lowpass filter stages being connected in series with an output of said first buffer circuit, an output of said series-connected second three subordinate lowpass filter stages being connected with an input of a second buffer circuit.

7. The automatic answering device according to claim 6, wherein said first and second buffer circuits comprise operational amplifiers having their non-inverting inputs operably connected with respective outputs of said series-connected first and second three subordinate lowpass filter stages, and having their inverting inputs each operably connected with their own outputs.

8. The automatic answering device according to claim 2, wherein said voice synthesizing circuit means comprises:

memory means for fixedly storing message voice data of said first through third answering messages in digital form, said voice data being stored at arbitrary addresses therein and being readable therefrom;

voice synthesizing section means operably connected with said memory means and via said third input/output line with said controller means, for synthesizing by linear predictive coding (LPC) said arbitrarily stored voice data to produce as synthesized speech said first through third answering messages, said voice synthesizing section means being controllable by said controller means via said third input/output line for selecting the data address in said memory means corresponding to one of said first through third answering messages in accordance with a corresponding message mode selected at said controller means, for reading out said voice data of said corresponding one of said first through third answering messages from said memory means and for synthesizing said corresponding one of said first through third answering messages therefrom; and lowpass filter means operably connected with a voice output of said voice synthesizing section means for eliminating high frequency sampled noise from said synthesized voice, an output of said lowpass filter means being operably connected with an input of said second adder circuit means.

9. The automatic answering device according to claim 8, wherein said lowpass filter means is comprised of two series-connected lowpass filter stages, said lowpass filter means having two poles and a cutoff frequency of 3.3 KHz.

10. In an automatic answering device for a vehicle radio-telephone, said automatic answering device having a user-operable controller means for selecting one of a selectable first answering message mode for informing a caller of a called party's absence and of a telephone number at which the called party may be called, a selectable second answering message mode for informing the caller of the called party's absence and requesting the caller to successively input dual-tone multifrequency (DTMF) key signals representing the caller's telephone number followed by a first DTMF key signal for recording the caller's telephone number, and a third selectable answering message mode for informing the caller of the called party's absence and requesting the caller to input a second DTMF key signal for permitting the caller to leave a voice message, the control method for establishing one of said first through third selectable answering message modes, comprising the steps of:

checking for the presence of a command for establishing any of said first through third answering message modes;

in the presence of a command for establishing an answering message mode, inputting to said controller means a message mode selection key signal for identifying one of said first through third answering message modes;

when said message mode selection key signal identifies said first answering message mode, checking for the presence of a recorded called party telephone number and, if same is present, establishing said first answering message mode;

when said message mode selection key signal identifies said second answering message mode, establishing said second answering message mode; and when said message mode selection key signal identifies said third answering message mode, establishing said third answering message mode.

11. In an automatic answering device for a vehicle radio-telephone, said automatic answering device having a user-operable controller means for selecting one of a selectable first answering message mode for informing a caller of a called party's absence and of a telephone number at which the called party may be called, a selectable second answering message mode for informing the caller of the called party's absence and requesting the caller to successively input dual-tone multifrequency (DTMF) key signals representing the caller's telephone number followed by a first DTMF key signal for recording the caller's telephone number, and a third selectable answering message mode for informing the caller of the called party's absence and requesting the caller to input a second DTMF key signal for permitting the caller to leave a voice message, the control method for operating said automatic answering device for executing any of said first through third answering message modes, comprising the steps of:

upon receiving an incoming call, checking whether one of said first through third answering message modes has been selected;

if said first answering message mode has been selected, transmitting a first answering message to the caller, for informing the caller of the called party's absence and of a telephone number at which the called party may be called;

if said second answering message mode has been selected, transmitting a second answering message for informing the caller of the called party's absence and requesting the caller to successively input DTMF key signals representing the caller's telephone number followed by a first DTMF key signal, and upon receiving said DTMF telephone number signals and first DTMF key signal input by the caller in response to said second answering message, storing the caller's input telephone number; or if said third answering message mode has been selected, transmitting a third answering message for informing the caller of the called party's absence and requesting the caller to input a second DTMF key signal for permitting the caller to leave a voice message, and upon receiving said second DTMF key signal input by the caller in response to said third answering message, recording a voice message from the caller.

* * * * *

UNITED STATES PATENT AND TRADEMARK OFFICE
CERTIFICATE OF CORRECTION

PATENT NO. : U.S. 5,058,150
DATED : 15 October 1991
INVENTOR(S) : Seo Wan KANG It is certified that error appears in the above-identified patent and that said Letters Patent is hereby corrected as shown below:

Column 1, Line 32, delete "the";

Line 50, insert --signal-- after "voice";

Column 2, Line 24, insert --operably connected with the antenna-- after "201";

Line 28, insert --operably-- after "being";

Line 30, change "signal" to --signals--;

Line 31, insert --operably-- after "being";

Line 34, insert --the-- after "received";

Line 35, insert --operably-- after "being";

Line 41, insert --operably-- after "being";

Column 3, Line 1, insert --is a block diagram which-- after "1";

Line 5, insert --block diagram of a-- after "a";

Line 7, insert --are schematic diagrams which-- before "illustrate";

Line 18, change "reproducing" to --reproduction--;

Line 28, insert a comma after "221";

UNITED STATES PATENT AND TRADEMARK OFFICE
CERTIFICATE OF CORRECTION

PATENT NO. : U.S. 5,058,150  
DATED : 15 October 1991  
INVENTOR(S) : Seo Wan KANG It is certified that error appears in the above-identified patent and that said Letters Patent is hereby corrected as shown below:

Column 3, Line 29, insert --(wideband data)--"WBD", insert --a-- before "first";

Column 3, Line 30, insert --a-- before "second";

Line 34, insert --(i.e. RF modulated)-- after "(RF)";

Line 36, insert --(modulated)-- after "RF";

Line 38, insert --(adaptive delta modulation)-- after "ADM";

Column 7, Line 6, insert --read out-- after "is";

Line 11, insert --voice-- before "signal";

Column 15, Line 46, insert --answering-- before "mode" (first occurrence)

Signed and Sealed this

Ninth Day of February, 1993

*Attest:*

STEPHEN G. KUNIN

*Attesting Officer*    *Acting Commissioner of Patents and Trademarks*